March 13, 1962 A. R. McCOURT 3,025,420

ELECTROMAGNETIC SPEED CONTROL COUPLING

Filed Sept. 22, 1958

Arthur R. McCourt

INVENTOR.

BY Clarence A. O'Brien and Harvey B. Jacobson, Attorneys

United States Patent Office 3,025,420 Patented Mar. 13, 1962

3,025,420 ELECTROMAGNETIC SPEED CONTROL COUPLING

Arthur R. McCourt, 1333 Schley St., Butte, Mont.
Filed Sept. 22, 1958, Ser. No. 762,480
8 Claims. (Cl. 310—103)

This invention relates generally to speed control and more particularly to a novel coupling device which may be utilized to transfer the rotation of a driving shaft to a driven shaft while controlling extremely closely the relative speed therebetween.

It is common knowledge that often the power or movement of one rotating shaft is desired to be transferred to another shaft at a different speed at a precise drive ratio. Conventionally, gear trains are utilized wherein meshing gears of different relative diameters proportionately increase the speed or decrease the speed of the driven shaft relative to the driving shaft. Of course, the use of meshing gears for this purpose is extremely old and proves very satisfactory in most instances. This invention relates to a device which allows for the coupling of two shafts and further introduces extremely sensitive speed control means for precisely relating the relative speeds of the two shafts. Obviously, the coupling means of this have significant benefits over the conventional gear train in that the relationship between the speeds of the two shafts may be infinitely varied electrically whereas in the gear train, the size of the meshing gears must be physically changed for stepped speed variation between precise drive ratios.

It is the principal object of this invention to provide a novel electromagnetic speed control coupling device which is capable of extremely sensitive control.

It is a further object of this invention to provide an electromagnetic speed control coupling device which is simple, reliable, and relatively inexpensive to manufacture and install.

It is a still further object of this invention to provide an electromagnetic speed control coupling device which is extremely simple to utilize and operate.

It is a still further object of this invention to provide a novel electric motor whose speed may be accurately controlled.

In accordance with the above stated objects below is particularly described the structure and operation of a novel electromagnetic speed control coupling device which has been developed to provide means for accurately controlling the speed of one rotation shaft with respect to another. The device includes a driving shaft having a laminated iron rotor fixed to the driving shaft with a multi-polar rotor winding on the rotor. A driven shaft supports a laminated iron stator having a multi-polar stator winding on the stator. The stator is concentrically supported about the rotor by ball bearings which allow the stator to rotate relative to the rotor. The rotor poles and stator poles are physically opposed. Slip rings carried by the shafts enable each of the windings to be energized from individual variable frequency sources.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
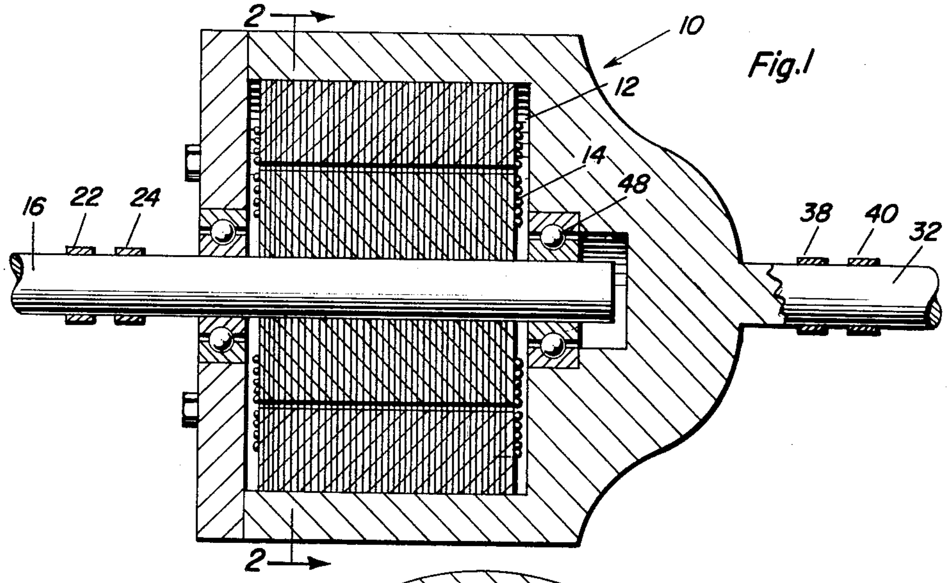
FIGURE 1 is a sectional view of the invention illustrating the relationship between the various elements.
Figure 2:
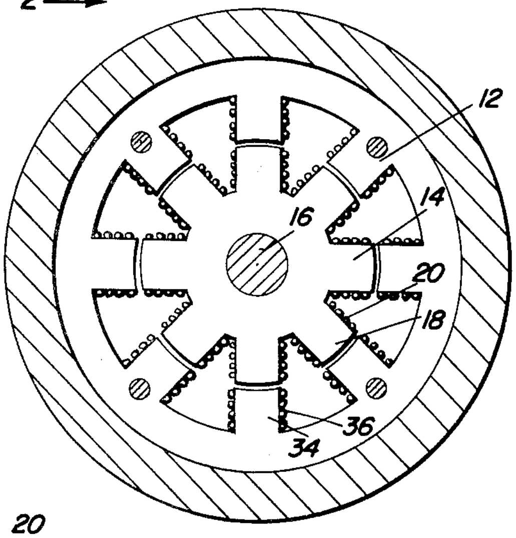
FIGURE 2 is a sectional view taken substantially on the plane 2—2 of FIGURE 1.
Figure 3:
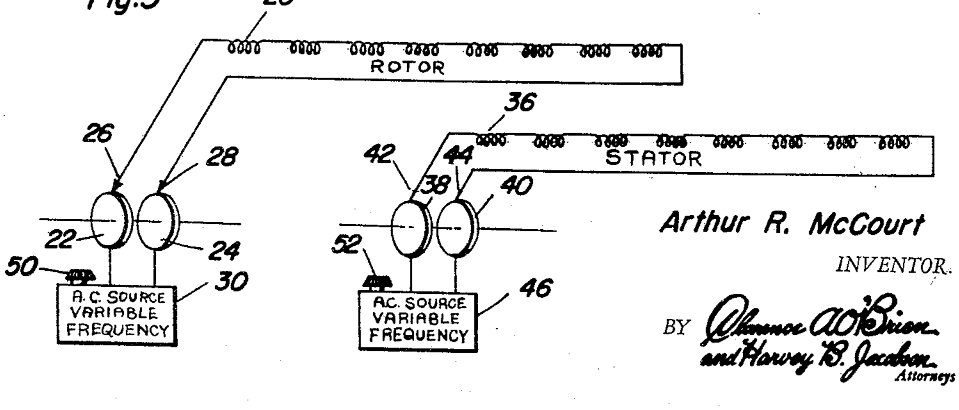
FIGURE 3 is an electrical wiring diagram indicating the electrical winding hook-up.

With continuing reference to the drawings numeral 10 generally represents the electromagnetic speed control coupling device comprising this invention and including a stator 12 and a rotor 14.

A driving shaft 16 has a laminated iron rotor 14 terminally fixed thereto. The rotor 14 includes a plurality of pole pieces 18 upon which are wound the rotor winding 20. Also carried by the driving shaft 16 are a pair of slip rings 22 and 24 which cooperate with brushes 26 and 28 for electrically connecting the rotor winding 20 to an electric source 30.

The driven shaft 32 fixedly supports a stator 12 thereon. The stator 12 includes a plurality of pole pieces 34 around which are wound the stator winding 36. The driven shaft 32 also supports a pair of slip rings 38 and 40 which electrically cooperate with brushes 42 and 44 for electrically connecting the stator winding 36 to an electrical source 46. It will of course be appreciated that the magnetic pole producing winding coils are non-rotating with respect to their mountings on the stator and rotor inasmuch as adjacent pole piece coils are connected in series as distinguished from the span of a single magnetic pole producing coil in the stator winding arrangement of induction type motors wherein the magnetic field electrically rotates with respect to its stator mounting.

The stator 12 is concentrically supported about the rotor 14 by ball bearings 48 which are fitted between the stator 12 and rotor 14.

The electrical sources 30 and 46 which electrically energize the rotor winding 20 and stator winding 36 through the slip ring brush combination may be any conventional type variable frequency alternating current source. The sources should include a sensitive control as at 50 or 52 whereby the frequency of the alternating current may be accurately controlled over a wide range.

In the operation of this invention for accurately controlling the speed of one rotating shaft with respect to another, let us assume that the driving shaft 16 is rotating at a particular speed. The rotor 14 which is fixed to the driving shaft 16 is of course also rotating at this speed. The variable frequency source 30 is electrically connected to the rotor winding 20 through the slip rings 22 and 24 and instantaneously establishes a non-rotating magnetic field of reversing polarity at peak strength on each of the pole pieces 18. Also, the variable frequency source 46 is similarly energizing stator winding 36 through the slip rings 38 and 40 and therefore an instantaneous peak strength reversing polarity is also being established on the stator pole pieces 34. As the driving shaft 16 is rotating, the opposed poles of the rotor and stator will align themselves in space-phase alignment so that a north pole will oppose a south pole and the magnetic flux between the poles across the air gap will lock the stator relative to the rotor and the stator will be driven at the same speed as the driving shaft as long as the frequencies of the sources 30 and 46 remain the same and high compared to the shaft speed. Now in order to control or vary the speed of the driven shaft 32 relative to the driving shaft 16, the stator winding 36 may be furnished for instance, with a frequency which is one cycle per second lower than the frequency furnished to the rotor winding 20. When this relationship is established, the stator will slip one pole each second so its speed (assuming four pole pairs are utilized as is illustrated) will be one-fourth of a revolution per second less than that of the rotor in order to re-establish the space-phase coupling alignment, and therefore the driven shaft will rotate exactly one-fourth of a revolution per second less than the driving shaft. It will be appreciated that since the frequencies of the magnetic pole producing current is high compared to the speeds of the rotor and stator, the small difference in frequency necessary to produce a comparatively greater difference in rotor and stator speeds, will never permit the development of any significant motor action during a speed change transition so as not to disturb the strictly coupling function of the magnetic fields. Also, the high frequency of the current will involve a small reduction in the coupling force from that of magnetic fields at constant peak strength. It should also be apparent that by proper utilization of the variable frequency sources 30 and 46 through the controls 50 and 52, a desired speed of the driven shaft 32 may be easily obtained relative to the driving shaft speed. As was noted above, it is apparent that the invention is better adapted for speed control and rotational transfer between shafts than the conventional gear train.

If either of the shafts, the driving shaft 16 or the driven shaft 32 is held stationary, and the power provided by the sources 30 and 46 is sufficient, the electromagnetic speed control coupling 10 may be utilized as an electric motor whose speed can be accurately controlled from zero revolutions per minute to a very high value. The principle of the speed control of the electric motor is of course the same as noted above for the device when used as a speed coupling.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electromagnetic speed control coupling comprising a rotatable rotor having a rotor winding, a rotatable stator having a stator winding concentrically supported about said rotor and adapted to rotate with respect thereto, means for mechanically driving said rotor, first variable frequency means for energizing said rotor winding electrically connected to said rotor winding, second variable frequency means for energizing said stator winding electrically connected to said stator winding.

2. The combination of claim 1 wherein ball bearings are utilized between said rotatable stator and said rotatable rotor.

3. The combination of claim 1 wherein slip rings electrically connect said variable frequency sources to said windings.

4. An electromagnetic speed coupling comprising a driving shaft, means for mechanically driving said driving shaft at a predetermined revolution frequency, a rotor winding on said driving shaft, a driven shaft, a stator winding on said driven shaft, means supporting said stator winding for rotation relative to said rotor winding and magnetic field producing, means electrically connected to each of said windings for individually energizing said windings in space-phase alignment relation at a selected frequency substantially in excess of said predetermined revolution frequency.

5. An electromagnetic speed control coupling comprising a driving shaft, means for mechanically driving said driving shaft at a predetermined revolution frequency, a rotor winding on said rotor, a driven shaft, a stator winding on said stator, means supporting said stator concentrically about said rotor and rotatable relative thereto, and magnetic field producing means electrically connected to each of said windings for individually energizing said windings in space-plane alignment relation at a selected frequency substantially in excess of said predetermined revolution frequency.

6. An electromagnetic speed control coupling comprising a driving shaft, means for mechanically driving said driving shaft at a predetermined revolution frequency, a laminated iron rotor fixed to said driving shaft, a multipolar rotor winding on said rotor, a driven shaft, a laminated iron stator fixed to said driven shaft, a multi-polar stator winding on said stator, said rotor poles physically opposing said stator poles, means supporting said stator concentrically about said rotor and rotatable relative thereto, and magnetic field producing means electrically connected to each of said windings for individually energizing said windings in space-phase alignment relation at a selected frequency substantially in excess of said predetermined revolution frequency.

7. A novel electric drive having a wide range of speed control comprising a multi-polar rotor winding, a multipolar stator winding concentrically supported with respect to said rotor winding and adapted to rotate with respect thereto at a controlled rate of slippage, first selectively variable frequency means connected to said rotor winding for electrically producing rotor carried magnetic poles, second selectively variable frequency means connected to said stator winding for electrically producing stator carried magnetic poles in space-phase alignment with said rotor carried magnetic poles for all rates of slippage of the stator winding.

8. The combination of claim 7, wherein said rotor winding is held stationary for retarding mechanical rotation of said stator winding.

References Cited in the file of this patent

UNITED STATES PATENTS

| | | |
|---|---|---|
| 488,305 | Bradley | Dec. 20, 1892 |
| 890,699 | Parker | June 16, 1908 |
| 1,723,528 | Schneider | Aug. 6, 1929 |
| 2,896,143 | Bekey | July 21, 1959 |